United States Patent [19]

Little

[11] Patent Number: 4,947,477

[45] Date of Patent: Aug. 7, 1990

[54] PARTITIONABLE EMBEDDED PROGRAM AND DATA MEMORY FOR A CENTRAL PROCESSING UNIT

[75] Inventor: Wendell L. Little, Carrollton, Tex.

[73] Assignee: Dallas Semiconductor Corporation, Dallas, Tex.

[21] Appl. No.: 164,097

[22] Filed: Mar. 4, 1988

[51] Int. Cl.⁵ ............................................. G06F 1/00
[52] U.S. Cl. .............................. 364/200; 364/243.3; 364/246.3; 364/246; 364/243; 364/246.6; 364/246.7
[58] Field of Search ... 364/200 MS File, 900 MS File

[56] References Cited

U.S. PATENT DOCUMENTS 4,445,170  4/1984  Hughes et al. ................. 364/200
4,789,963  12/1988  Takahashi et al. ............. 364/900

Primary Examiner—Gareth D. Shaw
Assistant Examiner—Rebecca L. Rudolph

Attorney, Agent, or Firm—Worsham, Forsythe, Sampels & Wooldridge

[57] ABSTRACT

A central processing unit with partitionable program and data memory includes a CRT (10) which is interfaced with an embedded program/data memory (14). The embedded memory (14) is a random access memory which has a user-defined partition address that defines an address above which all addresses are associated with program memory and below which all addresses are associated with data memory. The partition address is stored in a memory control register (106) and can be loaded therein upon initialization of the CPU (10). When the program address or the data address exceeds the address in the embedded memory (14), the CPU (10) is allowed to access external program memory (24) and external data memory (26). This is controlled by an allocation/range control logic circuit (108).

8 Claims, 3 Drawing Sheets

PARTITIONABLE EMBEDDED PROGRAM AND DATA MEMORY FOR A CENTRAL PROCESSING UNIT

TECHNICAL FIELD OF THE INVENTION

The present invention pertains in general to microprocessors and CPUs, and more particularly, to the program and data memory utilized to store operational instructions and data within the microprocessor during operation.

BACKGROUND OF THE INVENTION

After the CPU, memory represents the most important module of a microprocessor system. With most microprocessor based systems, memory is utilized for two functions. First, it is utilized to store program instructions, and second, it is utilized to store data. Once initialized, the microprocessor fetches a given set of instructions from the program memory and executes these instructions in a predetermined manner according to the particular program. Typically, this is a Read only function and the program memory is usually realized with a Read Only Memory (ROM). During execution of the program instructions, data is either generated or manipulated, and is read to or written from a random access memory (RAM). The size of the memory required for both the program memory and the data memory depends upon the particular application of the microprocessor, the size of the program, etc.

Present day microprocessors are packaged in standard packages which typically provide forty pins. Larger packages are now utilized with pin counts up to sixty-eight. The pins provide the important function of interfacing the microprocessor with the outside world. In order to accommodate this number of pins, the internal architecture of the microprocessor is designed to maximize the amount of information that can be transferred between the microprocessor and the outside world through the pins. It is therefore desirable to integrate as many functions as possible within the confines of the package to decrease the need to interface with peripheral devices.

Typically, a predetermined number of commonly used program instructions are stored in an onboard ROM with some RAM provided in the form of a scratch pad memory. However, when programs exceed the capacity of the internal ROM, it is necessary to go outside of the microprocessor to fetch the program instructions from an external program memory, bring the program instructions back in, and store them in internal registers. With respect to data, most microprocessors have internal RAM which can store a small amount of data, with the predominant storage medium residing outside of the microprocessor in the form of an external data memory. One reason that onboard data memory has been limited is size constraints, complexity, etc. For example, if a large bank of RAM were incorporated on board the CPU, this would require the use of a relatively high density RAM structure. This typically results in lower yield and more complex processing during fabrication. The manufacturers have therefore avoided large banks of RAM for use as internal data memory.

In order for a microprocessor to interface with external program and data memories, it is necessary to transfer addresses, data and instructions through the pins. Typically, the pins are grouped as to function so as to define system ports. When interfacing with the external program and data memories, it is necessary to dedicate a number of the system ports to the transfer of addresses, instructions and data. This therefore reduces the number of ports that the CPU can interface with other peripheral circuitry.

In view of the above disadvantages, there therefore exists a need for a microprocessor based system that provides additional memory space internal to the chip for both storage of program instructions and storage of data such that the microprocessor does not require the use of the system ports to interface with external program and data memory.

SUMMARY OF THE INVENTION

The present invention disclosed and claimed herein comprises a microprocessor system with an embedded memory. The system includes a central processor unit with an internal data bus for data transfer and an internal address bus for address transfer. The CPU is operable to fetch program instructions from a program memory in response to generation of instruction addresses on the internal address bus and execute the program instructions and transfer data to and from a data memory in response to generation of data addresses on the internal address bus. A random access memory is provided having a plurality of memory locations. Each of the memory locations is associated with a unique address which is received through interface circuitry from the internal address bus. A data input/output on the RAM is selectively interfaced with the internal data bus. Control signals are selectively output from the central processing unit through control interface circuitry to determine whether a Read or Write operation is performed on the RAM. A partition address is stored internal to the CPU which defines an address above which all addresses in the RAM are allocated to program instruction storage and below which all addressable locations are allocated toward data storage. Memory enable circuitry is provided to determine if the address on the internal address bus is an instruction address or a data address. The enable circuitry is operable to enable the RAM when program instructions are present on the internal address bus and the address is less than the partition address or when the address on the internal address bus is a data address and the address is determined to be greater than the partition address.

In another embodiment of the present invention, an external program memory is provided which is accessible by the CPU to fetch instructions therefrom. External program memory access circuitry is provided to access the external program memory when an instruction address is present on the internal address bus and the instruction address is determined to be greater than the partition address.

In yet another embodiment of the present invention, a range value is stored internal to the central processing unit and indicates the maximum addressable location in the RAM. When the address on the internal address bus exceeds the range value, access to the RAM is inhibited. An external data memory is provided that is accessible by the central processing unit for transfer of data to and from the external data memory for a Write operation and a Read operation, respectively. The external data memory is accessed when it is determined that a data address is present on the internal address bus and the address on the internal address bus exceeds the maximum addressable location in the RAM.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
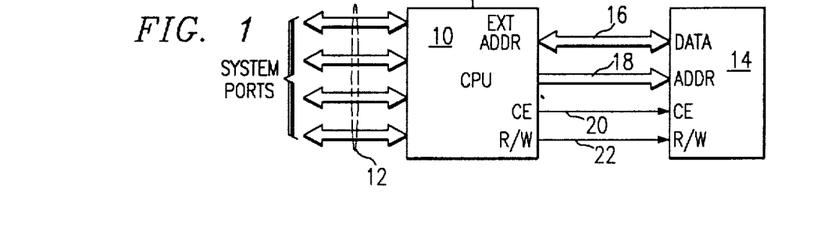
FIG. 1 illustrates a block diagram of a CPU utilizing the embedded program/data memory of the present invention.

Referring now to FIG. 1, there is illustrated a block diagram of a microprocessor system utilizing the partitioned memory of the present invention. A CPU 10 is provided which is operable to interface with four system ports 12. Typically, the system ports 12 occupy approximately thirty-two pins. In addition to the system ports 12, the CPU 10 also interfaces with an embedded program/data memory 14 through a bi-directional data bus 16 and an address bus 18. The data bus 16 is operable to carry eight bits of data with the address bus 18 operable to carry fifteen bits of address. In addition, a Chip Enable signal CE is provided on a line 20 and a Read/Write signal R/W is provided on a line 22. In the preferred embodiment, the embedded memory 14 is a 32K random access memory (RAM), which memory is utilized to store both program and data information. During operation, a portion of the embedded memory 14 is allocated toward storing of program instructions, which portion is utilized as a Read Only Memory and a portion of the embedded memory 14 is allocated for data storage is utilized as a random access memory. Although illustrated as external to the CPU 10, the embedded memory can be a part of CPU 10.

Figure 2:
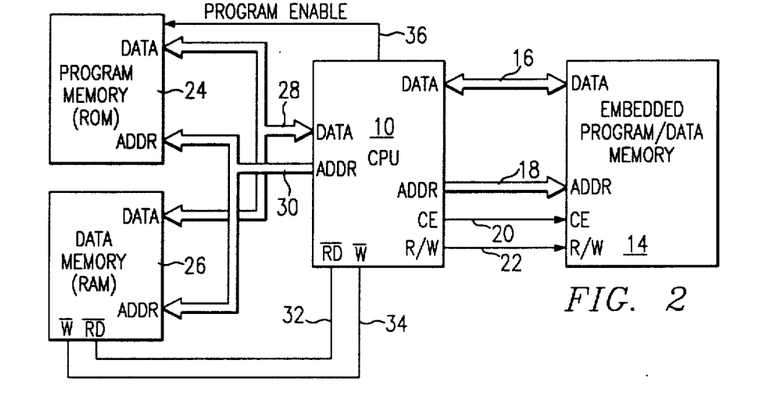
FIG. 2 illustrates a block diagram of the system of FIG. 1 with external program and data memory.

Referring now to FIG. 2, the CPU 10 is interfaced with an external program memory 24 and with an external data memory 26. The program memory 24 is a read only memory (ROM) and the data memory 26 is a random access memory (RAM). The CPU 10 interfaces with the data inputs of the memories 24 and 26 through a data bus 28 and with the address inputs thereof through an address bus 30. The data and address buses 28 and 30, respectively, can occupy up to three ports on the CPU 10 or they can be multiplexed and utilize only two ports.

The data memory 26 has a Read control line 32 disposed between the CPU 10 and the data memory 26 and a Write control line 34 disposed therebetween. Therefore, the CPU 10 can control the data memory 26 for a Read or a Write operation. The external program memory 24 is controlled through a control line 36 which has a Program Enable signal output thereon. Therefore, when the CPU 10 desires to access the external program memory 24 to fetch program instructions, the Program Enable signal is output on the line 36.

In operation, as will be described hereinbelow, the CPU 10 treats the embedded memory 14 as if it were on-chip memory. There is an internal memory control register which stores a partition address which defines which portion of the memory is allocated toward program instructions and which portion of the memory is allocated toward data. If the program exceeds the portion of the memory 14 allocated therefore, the remainder of the program is stored in the external program memory 24 and the CPU 10 then goes to the external program memory 24 to fetch instructions therefrom. In a similar manner, if the data to be stored exceeds the capacity of the allocated portion of the memory 14, the CPU 10 stores the data in the external data memory 26.

Figure 3:
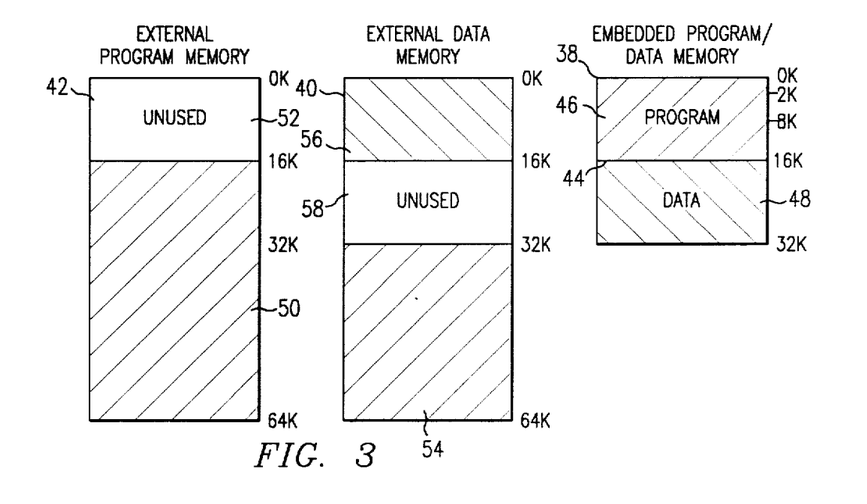
FIG. 3 illustrates the memory map for the program and data memory utilizing both the embedded memory of the present invention and the external memory.

Referring now to FIG. 3, there is illustrated a memory map of the embedded memory 14, the external program memory 24 and the external data memory 26. In the preferred embodiment, the embedded memory 14 has a capacity of 32K, whereas both the external program memory 24 and the external data memory have a capacity of 64K each. The embedded memory 14 has a partition address stored in an internal memory control register in the CPU. This partition address defines the address of the embedded memory 14 wherein all addresses above the partition address are allocated toward program storage and all addresses below the partition address are allocated toward data storage. The partition address is four-bits wide such that there are sixteen possible partitions. In the preferred embodiment, the embedded memory 14 is partitionable in 2K segments. This is illustrated by an embedded memory map 38. In a similar manner, an external data memory map 40 and an external program memory map 42 are illustrated, each providing from zero to 64K memory locations.

In FIG. 3, the partition address is defined at the address associated with the first 16K of memory as illustrated by a partition line 44. Therefore, the addresses associated with the first 16K of memory locations in the embedded memory 14 are allocated toward program instruction. This is represented by a shaded area 46 in the memory map 38 and above the partition line 44. In a similar manner, data storage is provided for all addresses associated with the memory locations between 16K to 32K and is illustrated by a shaded area 48 in memory map 38.

As described above, for programs that exceed the 16K capacity provided by the shaded area 46 in memory map 38, the CPU 10 will then fetch the additional instructions from the external program memory 24 when needed. Since this operation is transparent to the CPU, every instruction address that exceeds the partition address stored internal to the CPU 10 results in the CPU 10 fetching instructions from the program memory 24. Therefore, any program instructions stored in the external program memory 24 will be stored at address locations greater than the partition address. This is illustrated by an area 50 in the external program memory map 42. It should be noted that there is an unused portion of the external program memory 24, represented by an unshaded area 52 which corresponds to instruction addresses less than the partitioned address.

With respect to data storage, all data addresses that exceed the maximum capacity of 32K for the embedded memory 14 cause the CPU 10 to go outside to the external data memory 26. Therefore, data will be stored in the data memory 26 at all data addresses greater than the address associated with the maximum capacity of 32K for the embedded memory 14. This is represented by a shaded area 54 in the external data memory map 40. In a similar manner, all data addresses less than the partition address will also result in the CPU 10 going out to the external data memory 26. This data is associated with a shaded area 56 in the memory map 40 for the external data memory 26. It should be noted that there is an unused portion of the external data memory 26 for data addresses greater than the partition address and less than the address associated with the maximum capacity of the embedded memory 14. This is illustrated by an unshaded area 58.

In normal operation, the partition address 44 can be positioned anywhere within the memory map 38 within the constraints of the 2K segments. In such a manner, the user can allocate a larger portion of the embedded memory to the storage of program instructions if the application warrants this, or to data storage if the application warrants that. The purpose of the embedded memory 14 is to allow a user to free up the system ports 12 and substantially increase the internal random access memory. The embedded memory 14 appears to the CPU 10 as onboard program and data memory, since this memory is not interfaced through the system ports 12.

Figure 4:
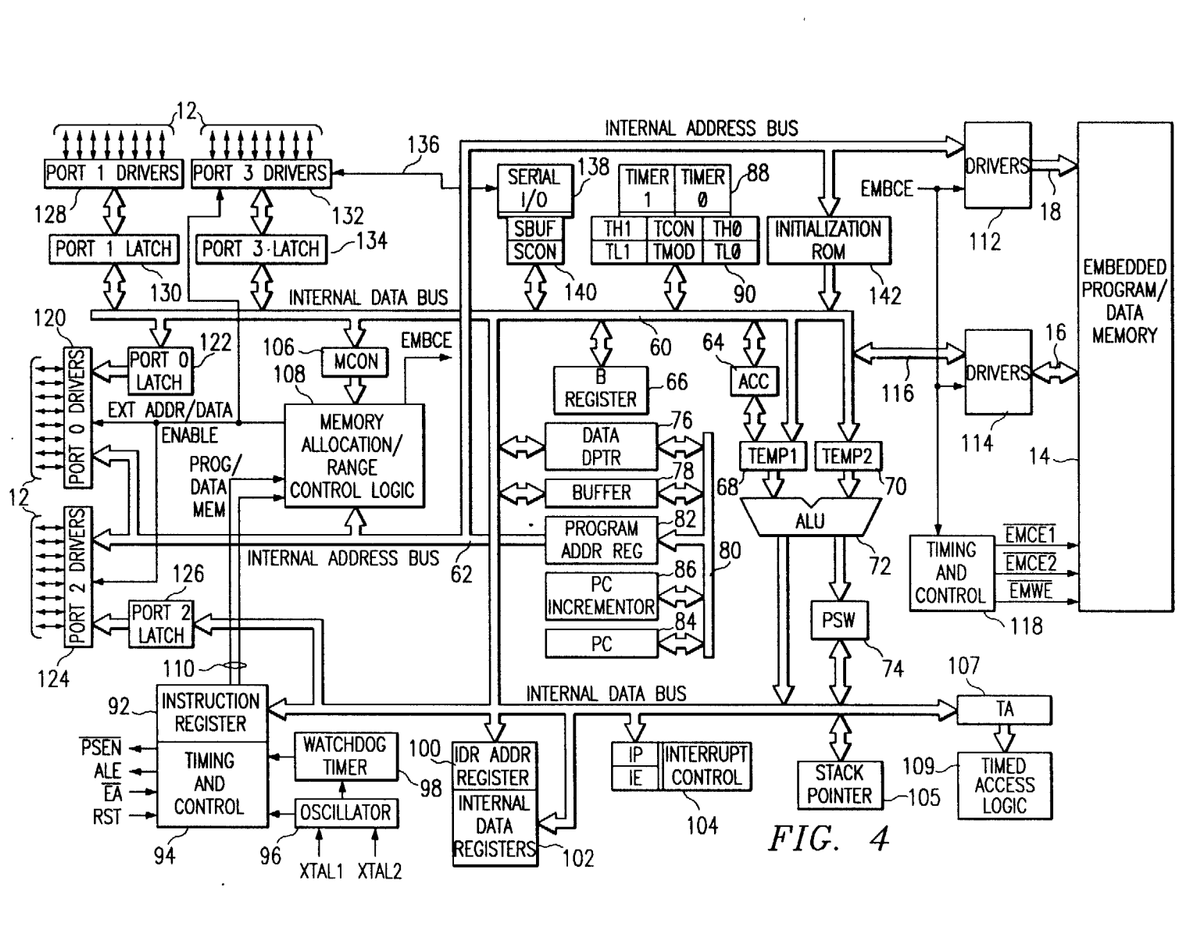
FIG. 4 illustrates a block diagram of the CPU for interfacing with the embedded memory.

Referring now to FIG. 4, there is illustrated a block diagram of the CPU 10. The CPU 10 utilizes conventional architecture with an internal data bus 60 and an internal address bus 62. An accumulator 64 and a B register 66 are interfaced with the internal data bus 60 with the accumulator 64 also being interfaced with a temporary register 68 (TEMP2). A temporary register 70 (TEMP1) is interfaced with the internal data bus 60, with the temporary register 68 also interfaced with the internal data bus 60. Both temporary registers 68 and 70 are interfaced with first and second inputs on an arithmetical logic unit 72 (ALU). The ALU output has one output connected to the internal data bus 60 and the other output connected to the internal data bus 60 through a status word register 74.

A data pointer 76 (DPTR) and various data buffers 78 are interfaced with the internal data bus 60. The data pointer 76 and buffers 78 are interfaced with an intermediate bus 80, which is interfaced to a program address register 82, the output of the program address register 82 being connected to the internal address bus 62. A program counter 84 (PC) is interfaced with the intermediate bus 80 in addition to a program counter incrementer circuit 86. Timer circuitry is provided through first and second timers 88, the outputs of which are stored in timer registers 90 that are interfaced with the internal data bus.

Instructions from the internal data bus are input to instruction register 92 which is interfaced with a timing and control circuit 94 that generates the various control signals. The timing and control circuit 94 controls the operation of all registers and circuits such as pointers, etc. on the CPU. The timing and control circuit 94 interfaces with control signals RST for a reset function, EA-bar for external address, ALE and PSEN-bar. The timing and control circuit 94 also receives on the input thereof an oscillator signal from an oscillator 96 which is connected to two external crystals XTAL1 and XTAL2. The oscillator output is connected to the input of a watchdog timer circuit 98 which has the output thereof connected to the timing and control circuit 94. The internal data bus 60 is also interfaced with an address register 100 and also with internal data register 102. The internal data buses also interface with various interrupt control logic 104. A stack pointer 105 and a timed access register 107 are also interfaced with the internal data bus 60. The timed access register 107 has the output thereof connected to a timed access logic circuit 109. The operation of the timed access register 107 and the timed access logic circuit 109 will not be described herein.

The partition address is stored in a memory control register (MCON) 106 which has the input thereof interfaced with the internal data bus 60 and the output thereof connected to a memory allocation/range control logic block 108. The control logic block 108 has another input therefore connected to the internal address bus 62 and also to control signals from the instruction register 92 on a two-bit bus 110. The instructions on the two-bit bus 110 determine whether the CPU is to fetch program instructions or data. The control logic block 108 outputs an enable signal EMBCE to enable the embedded memory 14 when it is determined that the data or instruction address is mapped into the embedded memory 14.

The internal address bus 62 is input to a driver circuit 112, the output of which is connected to the address bus 18 for receiving the address for the embedded memory 14. In a similar manner, the internal data bus 62 is interfaced with a driver 114 through a bi-directional data bus 116, the output of the driver 114 interfaced with the bi-directional data bus 116 and the data input of the embedded memory 14. A timing and control circuit 118 is provided for generating the Chip Enable and Write Enable signals for the embedded memory 14.

The four system ports 12 are designated as Port $\phi$, Port 1, Port 2 and Port 3. Port $\phi$ has associated therewith a driver 120 which has an address input interfaced with the internal data bus 60 through a latch 122 and a data input interfaced with the internal address bus 62. In a similar manner, Port 2 has an address input connected to a driver 124 which is interfaced directly with the internal address bus 62 and a data input interfaced with the internal data bus through a latch 126. Therefore, Port $\phi$ and Port 2 are operable to interface both address and data information, and can be utilized to interface with the external program memory 24 and the external data memory 26.

Port 1 has a driver 128 connected to the internal data bus through a latch 130 and Port 3 has a driver 132 interfaced with the internal data bus 60 through a latch 134. The Port 3 driver 132 is operable to receive serial data for interface with a serial I/0 circuit 138 through a serial data bus 136, the output of the serial I/0 circuit 138 interfaced through registers 140 to the internal data bus 60. The drivers 120 and 124 are each enabled by a signal output from the control logic circuit 108 with the signal EMBCE connected to the enable input of drivers 112 and 114 and the timing and control circuit 118. Driver 132 is operable to output control signals to external data memory 26 on lines 32 and 34. The control logic circuit 104 therefore determines whether the instruction addresses and data and associated instructions and data to be routed out through the system ports 12 or through the address bus 18 and data bus 16.

An initialization ROM 142 is provided which has the address input thereof interfaced with the internal address bus 62 and the data output thereof interfaced with the internal data bus 60. The initialization ROM 138 is operable to provide initial program instructions upon receiving a reset signal. This allows the system to initially input data for storage in the MCON register 106 to determine the partition address and various other initialization parameters for storage in various registers. This also allows a program to be stored in the embedded memory 14 since the embedded memory 14 is a random access memory and would have essentially no data stored therein when powered up or reset. The program stored in the initialization ROM 138 is a conventional program utilized to load data from the system ports 12 into the MCON register 106 and various other registers to initialize the chip, in addition to loading data from the system ports 12 into the embedded memory 14. Once the initialization program in the initialization ROM 138 has been executed, the program is turned over to the program instructions stored in the embedded memory 14 at locations above the partition address.

In operation, the partition address is initially loaded into the MCON register 106 during the initialization routine. Once loaded, the portion of the embedded memory 14 allocated to program instruction storage and the portion allocated to data storage is defined. Thereafter, the CPU 10 operates in a conventional manner in that it outputs instruction or data addresses to the internal data bus to fetch either instructions from the program memory or transfer data to or from the data memory. The CPU 10 operates transparent to whether the instructions are fetched from the embedded memory 14 or the external program memory 24 or whether data is fetched from the embedded memory 14 or the external data memory 26. The memory allocation/range control logic 108 makes the determination and determines where the address is to be routed to and where data is retrieved from or written to. The CPU 10 therefore needs to make no decision as to which memory to address. Rather, it need only output an instruction or data address, which address is routed to the appropriate memory, either the embedded memory 14 or program 24 or external data memory 26.

Figure 5:
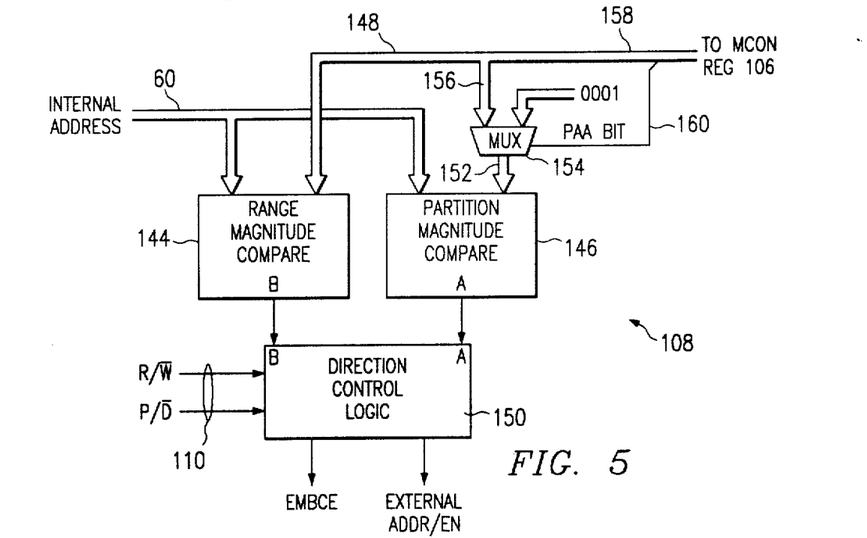
FIG. 5 illustrates a block diagram of the memory allocation/range control logic.

Referring now to FIG. 5, there is illustrated a block diagram of the memory allocation/range control logic block 108. The control logic block 108 is comprised of a range magnitude compare circuit 144 and a partition magnitude compare circuit 146. The range magnitude compare circuit is operable to receive the internal address from the internal address bus 60 and range information from a bus 148, which bus 148 interfaces with a range field of the MCON register 106. The range magnitude compare circuit 144 is operable to compare the address on address bus 60 with a range information which, in the preferred embodiment comprises a single bit. The range bit indicates whether the memory is a 8K memory or a 32K memory, and thus requires only two states. Although only one bit of the MCON register 106 is allocated to the range function, it should be understood that the range bit is a field which can be comprised of any number of bits, depending upon the type of information that is required. For example, a two-bit field would allow for four different size memories, 8K, 32K, 64K and 128K. The range magnitude compare circuit 144 outputs a logic high when the address on address bus 60 is greater than the range stored in the range field of the MCON register 106. This is input to a directional control logic circuit 150.

The partition magnitude compare circuit 146 is operable to receive the internal address from the internal address bus 60 and also the partition address from a bus 152. The bus 152 is connected to the output of a multiplexer 154 which has one input thereof connected to the MCON register 106 through a bus 156, which bus 156 is connected to the first four bits of a MCON bus 158. The bus 148 containing the range bit is also connected to the MCON bus 158. The other input of the multiplexer 154 is connected to a four-bit address "0001". A single bit, the PAA bit, of the MCON register 106 is connected to the control input of the multiplexer 154 through a line 160 which is connected to the MCON bus 158. The PAA bit comprises one of the control bit stored in the MCON register 106. The description of the PAA bit and the multiplexer 154 will be described hereinbelow.

In normal operation, the partition magnitude compare circuit 146 is operable to compare the four most significant bits of the sixteen-bit internal address with the four-bit partition address. The four-bit partition address for a 32K memory provides sixteen combinations, resulting in eight 2K partition segments in the 32K embedded memory 14. When there is a true comparison, a logic 1 is output on an output line to the directional control logic 150.

The multiplexer 154 is operable to select the "0001" partition address representing the first 2K partition segment when the PAA bit is sent to a logic high in the MCON register 106. The purpose of the PAA bit is to force the program memory allocation to only the first 2K bytes of the embedded memory 14. In this manner, the program is allowed the versatility to treat that portion of the embedded memory 14 allocated to program memory, as defined by the partition address, as data with the exception of the first 2K bytes. Therefore, the program is allowed to write over a portion of the program. However, it is important that a portion of the program be retained. Otherwise, no instructions could be fetched and executed. In this manner, the program is allowed to reprogram itself or to change internal instructions. In order to do this, it is necessary that this portion of the memory be temporarily treated as data and then be returned to program status. This is akin to rewriting the program in the data memory and then transferring the rewritten portion to the program memory by an external path.

The direction control logic circuit 150 is operable to receive the program/data memory control signals on the two line bus 110 and also the outputs of the range magnitude compare circuit 144 and the partition magnitude compare circuit 146 and output the control signals EMBCE and the external address/enable control signal. The EMBCE signal is utilized to enable the drivers for the embedded program/data memory 14 and the external address/enable signal is operable to control the system ports.

The range magnitude compare circuit 144 and the partition magnitude compare circuit 146 are each comprised of combinatorial logic that is made up in part of Exclusive OR gates. For the partition magnitude compare circuit 146, the exclusive OR gates receive on one input thereof a bit of the internal address from internal address bus 60 and on the other input thereof the respective partition address bit. Depending upon the logic scheme utilized, comparison of the two bits will provide a matched output when the two bits are equal. For example, only the four most significant bits of the address are utilized for comparison with the partition address.

Figure 6:
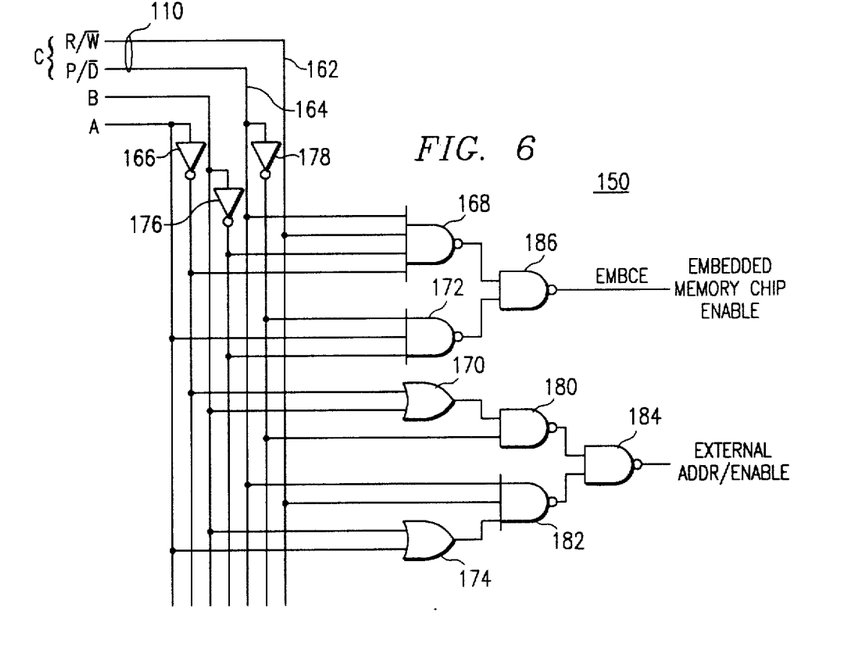
FIG. 6 illustrates a logic diagram of the direction control logic of FIG. 4.

Referring now to FIG. 6, there is illustrated a logic diagram of the direction control logic block 150. The direction control logic block 150 is operable to receive on an A-input thereof the output from the partition magnitude compare circuit 146 and on a B-input thereof the output from the range magnitude compare circuit 144. When the internal address is greater than the address stored in the partition field in the MCON register 106, the A-input is active high. In a similar manner, when the internal address is greater than the range of the embedded memory 14, as reflected in the range field of the MCON register 106, the B-output of the range magnitude compare circuit 144 is an active high. The two inputs to the direction control logic 150 on the two-bit bus 110 comprise the Read/Write control on a line 162 and a program/data memory select signal on a line 164. The lines 162 and 164 comprise the two-bit bus 110.

The A-input is connected to the input of an inverter 166. The output of inverter 166 is connected to one input of a four input NAND gate 168 and one input of an OR gate 170. The A-input is directly input to one input of a three input NAND gate 172 and to one input of an OR gate 174. The B-input is input to an inverter 176, the output of which is input to one input of the NAND gate 168 and one input of the NAND gate 172. The B-input is directly input to one input of the OR gate 170 and one input of the OR gate 174. The program/data memory select line 164 is input to an inverter 178, the output of which is input to one input of the NAND gate 172 and one input of a NAND gate 180. The other input of the NAND gate 180 is connected to the output of the OR gate 170. The program/data memory select line 164 is directly input to one input of the NAND gate 168 and one input of a three-input NAND gate 182. One input of NAND gate 182 is connected to one output of OR gate 174. The Read/Write control line 162 is directly input to one input of NAND gate 168 and one input of NAND gate 182.

The outputs of NAND gates 180 and 182 are input to respective inputs of a NAND gate 184, the output of which comprises the external address/data enable output which is input to the port drivers 120, 124, 128 and 132 in FIG. 4. The output of NAND gates 168 and 172 are input to respective inputs of a NAND gate 186, the output of which comprises the EMBCE signal which is input to the drivers 112 and 114 and the timing and control circuit 108. The EMBCE signal provides the enable function for the embedded memory 14.

In operation, the EMBCE signal on the output of NAND gate 186 goes to an active high whenever the output of either of the NAND gates 168 or 172 goes low. The output of NAND gate 168 goes low when all of the inputs thereof go high. This occurs whenever both the A- and the B-input are low, indicating an address less than the range field and partition field, and there is an active high on the line 164 indicating the program mode and there is an active high on line 162 indicating a Read operation. Therefore, NAND gate 168 has a low on the output thereof when the CPU 10 is addressing instructions within the range of the embedded memory 14. The NAND gate 172 has an active low in the output thereof when all of the inputs thereof are high. This occurs when either the A-input is high, indicating an address greater than the partition field, and when the line 164 is an active low, indicating the data mode, and when the B-input is low. Therefore, the NAND gate 172 outputs an active low whenever the CPU 10 is outputting addresses to read or write data within the range of the embedded memory 14.

The external address/enable output on the output of the NAND gate 184 is an active high whenever the output of either the NAND gates 180 or 182 are low. If the output of both of the NAND gates 180 and 182 go high, the external address/enable signal goes low. The NAND gate 180 has a logic low on the output thereof when the line 164 has a low thereon, indicating the data mode, and either the B-input is high, indicating an address greater than the range field, or the A-input is high, indicating data access with the address being greater than the partition field. This condition exists when the CPU 10 is in the data mode and the range has been exceeded, or when the CPU is in the program mode and the address is an instruction address greater than the partition address. In this situation, the upper portion 56 of the external data memory is accessed, which corresponds to data addresses less than the partition address on the lower partition 54 of the external data memory map 40 is accessed which corresponds to an address greater than the range.

The NAND gate 182 has a logic low in the output whenever the line 164 is high, indicating the program mode of the CPU 10, and the line 162 is high, indicating a Read operation, and either the A-input is high, indicating an address greater than the partition field, or the B-input is high, indicating an address greater than the range field. Therefore, whenever the CPU is in the program mode and there is a Read operation, and either the address has exceeded the range or the address has exceeded the partition field, the external address/enable signal is generated.

In summary, there is provided an embedded random access memory for a microprocessor based system with a partitionable address. The partitionable address defines the boundary in the memory above which all addresses are associated with program memory and below which all addresses are associated with data memory. The partitioned address is user defined and is stored in an internal register. The memory can either be built on-chip or can be disposed external to the chip through an additional port, thus freeing all the system ports to the CPU. Additionally, when the address exceeds the range of either the embedded program memory or the embedded read memory, the CPU is then connected with external program memory and external data memory.

Although the preferred embodiment has been described in detail, it should be understood that various changes, substitutions and alterations can be made therein without departing from the spirit and scope of the invention as defined by the appended claims.

What is claimed is:

1. A microprocessor based system with an embedded memory comprising:

a central processor unit with an internal data bus for data transfer and an internal address bus for address transfer, said central processing unit operable to fetch program instructions from a program memory for execution thereof and transfer of data to and from a data memory;

a random access memory having a plurality of memory locations each associated with a unique address, said random access memory having an address input for receiving an address and accessing the one of the plurality of memory locations associated therewith, said random access memory having a data input/output for inputting data to the accessed one of said memory locations or outputting data therefrom and a control input for enabling said random access memory to either input data or output data;

allocation means for defining a first portion of said random access memory as program memory for interfacing with said central processing unit and for defining a second portion of said random access memory as data memory for interfacing with said central processing unit, the size of said first and second portions variable in response to signals received external to said central processing unit;

address interface means for selectively interfacing the address input of said random access memory with the internal address bus of said central processing unit;

data interface means for selectively interfacing the data input/output of said random access memory with the internal data bus of said central processing unit; and read/write control interface means for routing control signals from said central processor unit to said random access memory;

wherein said allocation means comprises;

means for storing a partition address, said partition address constituting an address above which all addresses are program instruction addresses associated with program instructions and below which all addresses are data addresses associated with data addresses:

means for determining whether addresses on the internal data bus of said central processing unit are instruction addresses or data addresses, in accordance with definitions made by said allocation means;

means for controlling said address interface means and said data interface means to said random access memory with said central processor units when addresses are determined to be instruction addresses and have an address less than said partition address or the addresses are determined to be data addresses and have an address greater than said partition address;

means for controlling said read/write control means to provide a Read only function when said means for determining determines the presence of instruction addresses having an address less than said partition address and to provide a random access mode to either Read or Write data to said random access memory when said means for determining determines that a data address is present having an address greater than said partition address;

said partition address being variable in response to signals received external to said central processing unit;

and further comprising;

an external program memory which has an address input and a data output and provides a Read Only function, said external program memory operable in response to control signals received from said central processing unit to output data for interface with the internal data bus to provide a Read Only function to output program instructions to said central processing unit;

an external data memory having an address input and a data output for providing a random access function to transfer data to and from the internal data bus in response to control signals and data addresses received from said central processing unit; and steering means for interfacing the internal address bus with the address input of said external program memory and the internal data bus with the data output of said external program memory when said means for determining determines that instruction addresses are present on the internal address bus and the addresses are greater than said partition address;

said steering means being operable to interface the internal address bus of said central processing unit to said address input of said external data memory, and the internal data bus of said central processing unit with the data input/output of said external data memory when said means for determining determines that the address on the internal address bus is a data address and the data address is less than said partition address.

2. The system of claim 1 wherein said means for storing comprises a register and said partition address is stored therein in response to external data input to said central processing unit, said central processing unit receiving said external data for storage in said register.

3. The system of claim 1 further comprising:

range means for determining if said address is greater than the maximum address associated with said random access memory; and inhibit means for inhibiting said means for controlling said address interface means and said data interface means to interface said random access memory with said central processing unit.

4. The system of claim 1 further comprising:

register means for storing range information, said stored range information indicating the maximum address of said random access memory, which range information is utilized by said range means; and means for altering the contents of said register means such that different sizes of random access memories can be utilized.

5. A microprocessor system with an embedded memory, comprising:

a central processor unit with an internal data bus for data transfer and an internal address bus for address transfer, said central processing unit operable to output instruction addresses on the internal address bus to fetch program instructions from a program memory and execute the program instructions and output data addresses on the internal address bus to transfer data on the internal data bus to and from a data memory;

a random access memory having a plurality of memory locations each associated with a unique address, said random access memory having an address input for receiving an address and accessing the one of the plurality of memory locations associated therewith, said random access memory having a data input/output for inputting data to the accessed one of said memory locations or outputting data therefrom, said random access memory having a control input for enabling said random access memory and determining whether data is input or output from said accessed one of said memory locations;

interface means for interfacing the internal data bus with said data input/output of said random access memory and the internal address bus with said address input of said random access memory;

partition means for defining a first portion of said random access memory as program memory for the central processing unit and for defining a second portion of said random access memory as data memory for interfacing with said central processing unit, the size of said first and second portions variable in response to signals received external to said central processing unit; and memory control means for determining whether addresses on the internal address bus are instruction addresses or data addresses, said memory control means being operable to control said interface means to access the address input and the data input/output of said random access memory when either instruction addresses or data addresses are present on the internal address bus and to output control signals to said random access memory to control said random access memory to only output data when the addresses on the internal address bus are program addresses, and to operate in a random access mode when addresses on the internal address bus are data addresses, said central processing unit determining whether data is to be input or to be output from the data memory when data addresses are present;

wherein said partition means comprises:

a memory register for storing a partition address:

said partition address being stored therein in response to signals received external to said central processing unit, wherein said central processing unit is operable to route data from the internal data bus to the said memory control register; and said partition address constituting an address above which all addresses are associated with instruction addresses and below which all addresses are associated with data addresses;

and wherein said memory control means comprises:

partition address compare means for comparing said partition address in said memory control register with the address on the internal address bus and outputting a first signal if the address on the internal address bus is less than said partition address and outputting a second signal if the address on the internal address bus is greater than said partition address;

determining means for determining if the address on the internal address bus is an instruction address or a data address; and memory enable means for controlling said interface means to access said random access memory when either said first signal is present and it is determined that the address on the internal data bus is an instruction address or when said second signal is present and the address on the internal address bus is determined to be a data address;

and further comprising:

an external program memory accessible by said central processing unit to output instruction addresses thereto and fetch instructions therefrom for interface with said address bus; and external program memory access means for accessing said external program memory to route instruction addresses to the address input thereof and receive information from the data output thereof for interface with the internal data bus if said second signal is present and said determining means determines that the address on the internal address bus is greater than said partition address.

6. The system of claim 5 and further comprising means for storing a range value indicating the maximum address associated with said random access memory wherein said memory enable means is operable to enable said random access memory when said means for determining determines that the address on the internal address bus is a data address and said second signal is generated and the address on the internal address bus does not exceed the range value.

7. The system of claim 6 wherein the contents of said storage means for storing said range value is alterable in response to signals generated external to said central processing unit.

8. The system of claim 6 and further comprising:

an external data memory accessible by said central processing unit to output data addresses thereto and output data thereto for a Write operation and receive data therefrom for a Read operation; and external data memory access means for accessing said external data memory when either said first signal is generated by said partition address compare means and said means for determining determines that the address on the internal address bus is a data address, or when said second signal is generated by said partition address compare means and the address on the internal address bus exceeds the range value.

* * * * *